United States Patent [19]

De Shon

[11] Patent Number: 4,713,937

[45] Date of Patent: Dec. 22, 1987

[54] MULTIPLE DRIVE BUOYANCY ENGINE

[76] Inventor: Dennis A. De Shon, 7242 Seven Oaks Ave., Baton Rouge, La. 70821

[21] Appl. No.: 854,048

[22] Filed: Apr. 21, 1986

Related U.S. Application Data

[63] Continuation-in-part of Ser. No. 771,363, Aug. 30, 1985, abandoned.

[51] Int. Cl.[4] ............................................. F03B 17/02
[52] U.S. Cl. ...................................................... 60/495
[58] Field of Search ...................... 60/495, 496; 415/7; 290/1 R

[56] References Cited

U.S. PATENT DOCUMENTS 2,135,110  11/1938  Platt ..................................... 60/496

FOREIGN PATENT DOCUMENTS 79676  5/1983  Japan ..................................... 60/495

Primary Examiner—Stephen F. Husar

[57] ABSTRACT

A buoyancy engine having a plurality of vertically stacked drive units, immersed in a vessel of mercury, and rotatably mounted on axial drive shafts supported on sealed bearings in the vessel walls. The drive units are composed of capture modules, incorporating electromagnetic fields, fixed to the extreme ends of a plurality of arms extending from the drive shafts. The capture modules are designed to hold rigid-walled buoyant capsules injected through a pressurized airlock. When operating, drive units have capture modules moving upward, due to the buoyancy of the capsules, and empty capture modules moving downward. As a capture module containing a capsule reaches the top of its lifting arc, its electromagnetic field switches off and allows the capsule to be released into the next subsequent drive unit's lowermost capture module. As empty modules of the initial drive unit reach the bottom of their downward arc, the computer, programmed with the rotational speed of the drive unit, knows when the module is in position for capsule acquisition, and injects a capsule into the module, which then begins its ascent. Each drive unit is meshing-gear locked into synchronous rotation relative to other drive units. Modules containing capsules have great buoyancy and produce rotational force, transmitted through the drive unit's drive shaft axle, to turn the electric generator, or the like for supplying power for various uses. Capsules completing the power cycles through all drive units are removed through a vent in the top of the vessel and replaced in the magazine.

1 Claim, 2 Drawing Figures

MULTIPLE DRIVE BUOYANCY ENGINE

This application is a continuation-in-part of Ser. No. 771,363 filed 8/30/85 (abandoned).

BACKGROUND OF THE INVENTION

1. Field of the Invention

This invention relates generally to apparatus for producing power and relates more generally to apparatus utilizing the buoyancy of air contained in rigid capsules.

2. Description of the Prior Art

There have been various devices that have been proposed for producing power inexpensively, but these have not proven to be satisfactory.

SUMMARY OF THE INVENTION

The invention comprises a plurality of drive units mounted on drive shafts supported on sealed bearings in the walls of a vessel containing mercury. Each of the drive units is composed of hydrodynamically styled capture modules fixed to the extreme ends of arms extending from the drive shafts. Each drive unit is locked into synchronous rotation relative to all other drive units through a gear, mounted on its drive shaft axle which meshes with like gears on all other drive units. Cylindrical rigid-walled capsules containing air are stored in a magazine and are introduced into the vessel, at a point directly below the lowermost drive unit, through a computer controlled airlock which is pressurized by an air compressor. At startup, the lowermost capture module is manually positioned at its lowermost position, over the airlock. The first capsule is injected into the vessel and nests in the recess of the lowermost capture module of the initial drive unit. The capture modules incorporate an electromagnetic field which switches on when the capture modules reach their lowermost position—180 degrees—holding the capsules within. The relative buoyancy of the capsule causes the drive unit to rotate upwardly producing rotary power through the drive unit axle, which in turn produces power by the rotation of the electric generator, or other suitable device, attached to the drive unit axle. At the uppermost point of the capture module's arc of lift, it is in a position directly below the lowermost capture module of the next subsequent drive unit. The electromagnetic field of the capture module switches off at the capture module's uppermost position—360 degrees—and allows the capsule to then be released from the initial capture module and captured in the recess of the lowermost capture module of the next subsequent drive unit. The computer is programmed with the rotational speed of the drive units, based on the buoyancy, and resultant ascent speed, of the capsules. It, therefore, knows when the next capture module is positioned at its lowermost position. A second capsule is now introduced into the lowermost capture module of the initial drive unit and repeats the sequence as did the first. Capsules continue to be injected into the lowermost capture modules of the lowermost drive unit. Capsules having passed through all drive units are replaced in the magazine for re-injection. The generation of rotary power in all drive units is additive, while the cost of injection of the capsules is incurred only at the initial drive unit.

OBJECTS AND ADVANTAGES OF THE INVENTION

It is an object of the invention to provide a power unit of this character to produce power over and above that produced for operation of the apparatus.

It is another object of the invention to provide apparatus of this character that is simple in construction and operation.

It is a further object of the invention to provide apparatus of this character that is relatively inexpensive to manufacture and maintain.

The characteristics and advantages of the invention are further sufficiently referred to in connection with the following detailed description of the accompanying drawings, which represent one embodiment.

After considering this example, skilled persons will understand that many variations may be made without departing from the principles disclosed and I contemplate the employment of any structure, arrangements or modes of operation that are properly within the scope of the appended claims.

BRIEF DESCRIPTION OF THE DRAWINGS

Referring to the drawings which are for illustrative purposes only.

DESCRIPTION OF THE PREFERRED EMBODIMENT

Figure 1:
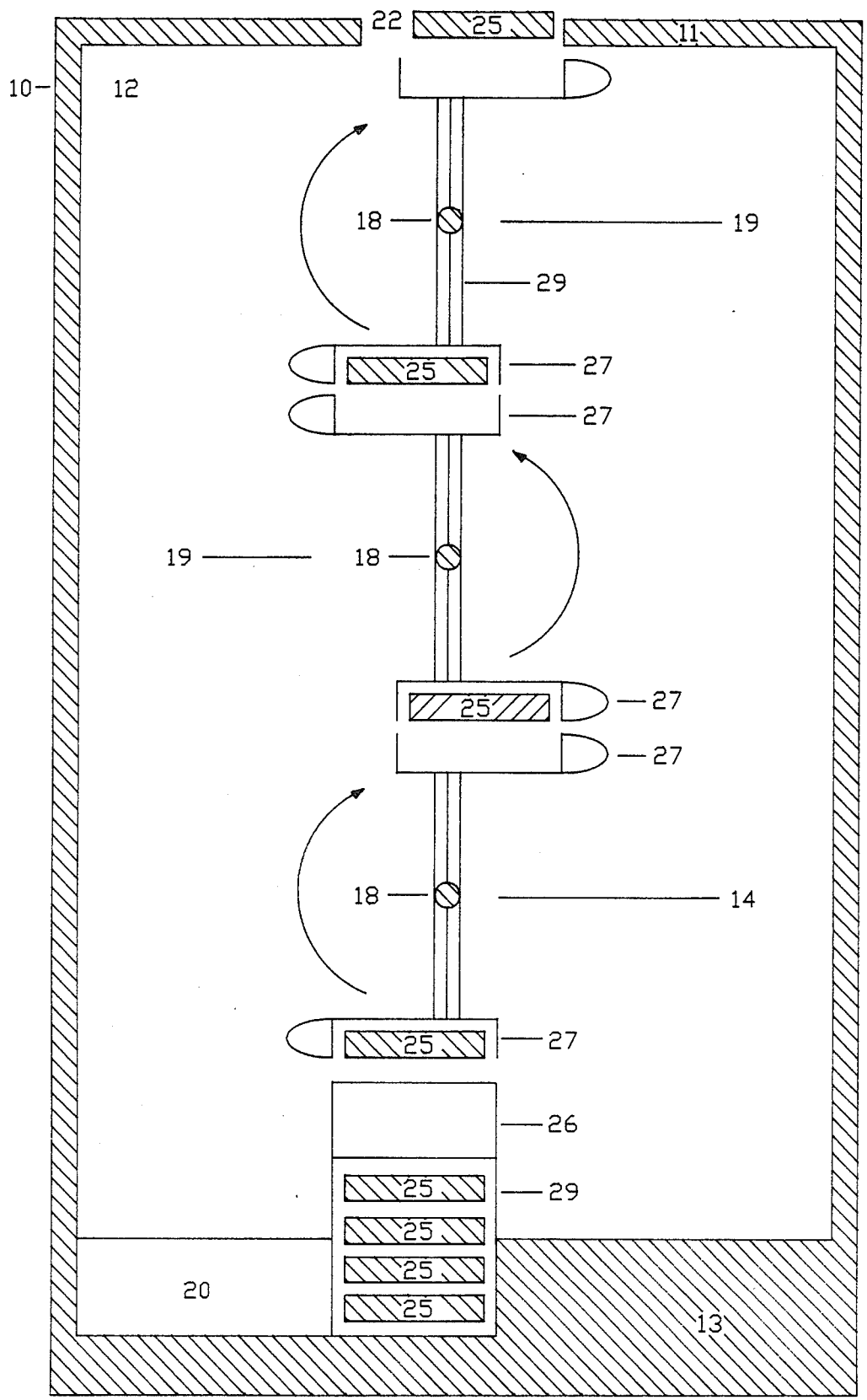
FIG. 1 is a schematic view of apparatus embodying the present invention, with the capture modules cross-sectioned to show the position of the capsules.

Referring more particularly to FIG. 1, there is shown apparatus (10) embodying the present invention. A plurality of drive units (14) and subsequent drive units (19) are immersed in a vessel (11) containing mercury (12), although alternative liquids may be used if desired. Rigid capsules containing air (25), although other gases or solids may be utilized if desired, are stored in a magazine (29) and are injected into the vessel by a computer controlled airlock (26), which is pressurized by an air compressor (20). Hydrodynamically designed capture modules (27) are attached to the the drive shafts (18) at the extreme ends of the plurality of arms (29) extending from the drive shafts. As the lowermost capture module of the lowermost drive unit is positioned above the airlock, the capsule is injected into, and is contained in, the capture module, by the electromagnetic field within the capture module. The buoyancy of the capsule will force the module containing it to rotate upwards until it reaches its uppermost point, at which time the electromagnetic field of the capture module switches off and allows the capsule to be released. The module is then captured by the lowermost capture module of the subsequent drive unit, and begins its ascent, as in the initial drive unit. The upward rotation of the initial capture module, in the initial drive unit, also causes a like amount of downward rotation of the initial drive unit's other capture module. The computer is programmed with the rotational speed of the drive unit, based on the buoyancy of the capsules, so that is knows when the capture modules are positioned for capsule acquisition, at their lowermost—180 degree—position. Capsules are injected into the initial drive unit's capture modules as each is sequenced in its lowermost position over the airlock. The vessel (11) sits on a base (13) and has a vent (22) for removal of capsules which have completed their cycle through the drive units.

Figure 2:
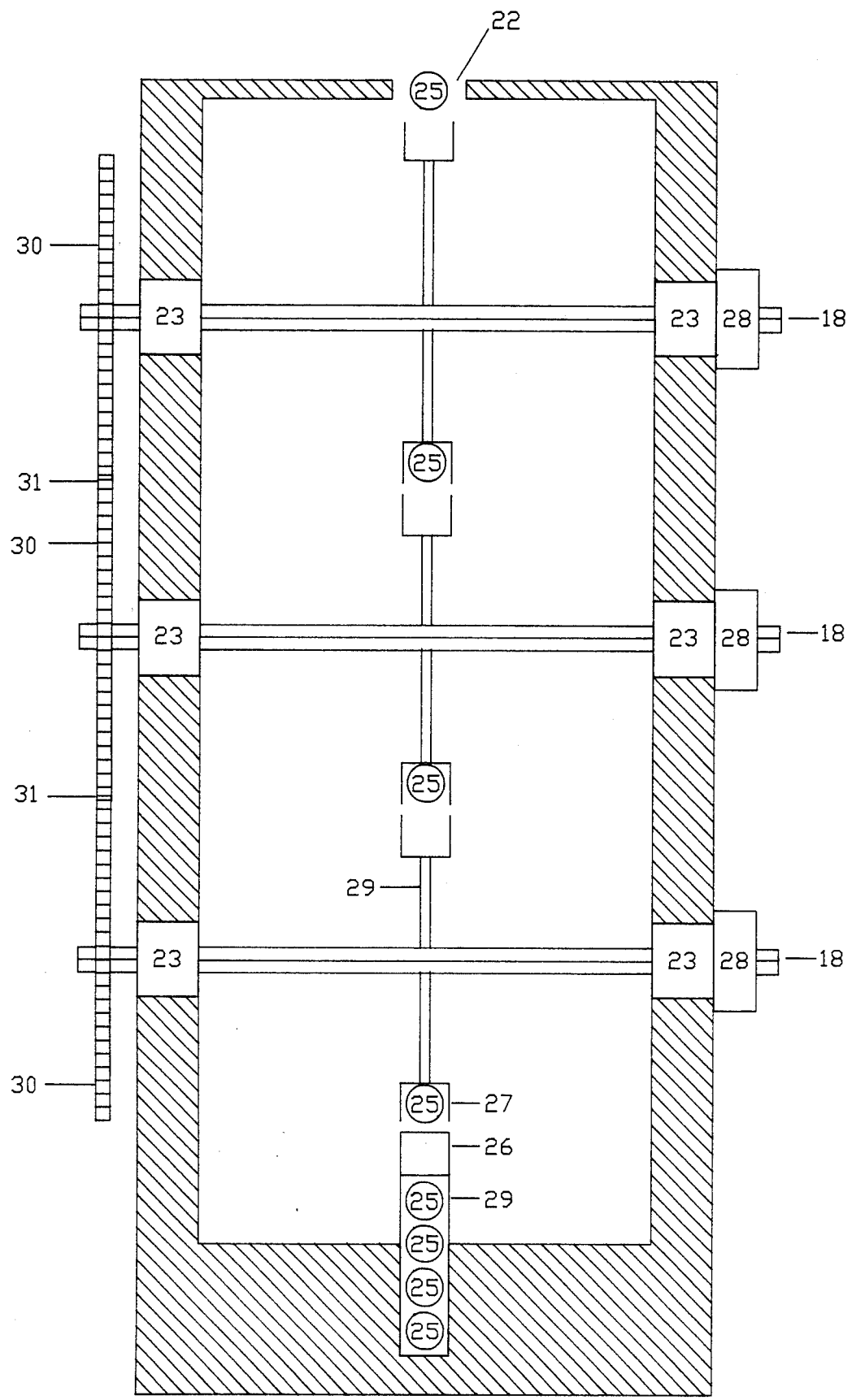
FIG. 2 is a schematic view of apparatus embodying the present invention, with the the capture modules cross-sectioned to show the position of the capsules, and the vessel walls sectioned to show the positioning of the sealed bearings mounted in the vessel walls.

Referring to FIG. 2, the drive units are mounted on drive shafts (18) supported by sealed bearings (23) in the vessel walls, and provide rotary force for the electric generators (28) mounted on the drive shafts, to supply electrical energy for various purposes. The drive shafts may be connected to other devices or apparatus, should it be so desired. The drive units are linked into simultaneous rotation by gears (30) mounted on the drive shafts, and which engage at points (31).

The invention and its attendant advantages will be understood from the foregoing description and it will be apparent that various changes may be made in the form, construction and arrangement of the parts without departing from the spirit or scope thereof or sacrificing its material advantages, the arrangement hereinbefore being merely by way of example; and I do not wish to be restricted to the specific form shown or uses mentioned except as defined in the accompanying claims.

I claim:

1. A multiple drive buoyancy engine, comprising:
    a plurality of vertically stacked drive units disposed in a vessel containing mercury;
    drive units having axial drive shafts extending outwardly thereof and supported by sealed bearings in the vessel walls;
    drive units incorporating electromagnetic capture modules, designed to receive capsules, and which are positioned at the extreme ends of hydrodynamically designed arms;
    said capture modules designed to hold capsules through their lift cycle, and to release capsules, at the top of the lift cycle, into the lowermost capture module of the next subsequent drive unit;
    said capsules having rigid walls, and containing air;
    a rotational-speed programmed, computer controlled airlock, pressurized by an air compressor, which injects capsules into the lowermost capture modules as they are rotated into alignment;
    meshing gears on each of the protruding drive shaft axles, which ensure rotational alignment and sequencing of the capture modules to receive capsules.

* * * * *